United States Patent [19]

Fausett et al.

[11] E Patent Number: Re. 33,232

[45] Reissued Date of Patent: Jun. 12, 1990

[54] STORAGE HAMMOCK

[76] Inventors: Kirk A. Fausett; Linda S. Fausett, both of Rte. 1, Box 736-A, Astoria, Oreg. 97103

[21] Appl. No.: 350,714

[22] Filed: May 11, 1989

Related U.S. Patent Documents

Reissue of:

[64] Patent No.: 4,664,266
Issued: May 12, 1987
Appl. No.: 778,493
Filed: Sep. 20, 1985

[51] Int. Cl.[5] ..... A47F 5/08
[52] U.S. Cl. ..... 211/87; 211/88
[58] Field of Search ..... 211/87, 88, 118; 5/122, 5/120

[56] References Cited

U.S. PATENT DOCUMENTS

| | | |
|---|---|---|
| 428,622 | 5/1890 | Moody . |
| 483,069 | 9/1892 | Legg . |
| 1,286,947 | 12/1918 | Creed . |
| 1,479,903 | 1/1924 | Erland . |
| 1,827,447 | 10/1931 | Wilmore . |
| 1,885,493 | 7/1931 | Tyler . |
| 1,960,655 | 8/1932 | Zwack . |
| 2,123,268 | 1/1938 | Young . |
| 2,355,635 | 3/1940 | Dubilier . |
| 2,712,349 | 4/1951 | Le Voir . |
| 2,714,281 | 8/1955 | Steele . |
| 2,722,968 | 11/1955 | Smith . |
| 2,828,044 | 3/1958 | Reiss et al. . |
| 3,009,740 | 11/1961 | Nelson et al. . |
| 3,011,820 | 12/1961 | Frieder et al. . |
| 3,790,171 | 2/1974 | Anderson . |
| 3,863,981 | 3/1973 | Doyle . |
| 4,015,719 | 1/1975 | Hanopole . |

FOREIGN PATENT DOCUMENTS

| | | |
|---|---|---|
| 608311 | 1/1935 | Fed. Rep. of Germany . |
| 738469 | 10/1955 | United Kingdom . |

OTHER PUBLICATIONS

Bates numbered document 500048 with the notation "Small World/Jul., 1977".

Bates numbered document 500066 with the notation "Exporters Semimonthly Nov. 16, 1984".

Bates numbered document 500213 with the notation "House Beautiful, Nov. 1975".

U.S. Design Pat. No. 263,663 (Moreau) issued Apr. 6, 1982 and discloses a Hammock.

U.S. Design Pat. No. 274,390 (Shakas) issued Jun. 26, 1984 and discloses a Crib Hammock.

Bates numbered document 500014 with the notation "Mothers' Manual May, Jun. 1977".

Header card for product known as the "Stowaway Gear Bag".

*Primary Examiner*—Robert W. Gibson, Jr.

*Attorney, Agent, or Firm*—Fleit, Jacobson, Cohn, Price, Holman & Stern

[57] ABSTRACT

A storage hammock usable for a variety of purposes, including the safe and effective storage of toys in a child's room, consists of an isosceles right triangular body of netting bound along its edges so that when suspended by its corners a pouch is formed thereby in which objects may be stored. Rings for hanging the hammock from a room corner are placed at each of the apices of the triangular body member.

25 Claims, 2 Drawing Sheets

STORAGE HAMMOCK

Matter enclosed in heavy brackets [ ] appears in the original patent but forms no part of this reissue specification; matter printed in italics indicates the additions made by reissue.

BACKGROUND OF THE INVENTION

The present invention generally relates to an apparatus used for storing items, and more particularly to a triangular hammock for storing toys or the like.

In the home, it is desirable to store items in a convenient and orderly manner to provide a clean, neat, and comfortable household. However, it is often difficult to do so in those portions of the home occupied by small children, especially if the children have a large quantity of toys.

Conventional methods of storing toys and other items in a child's room involve the use of boxes, toy chests, and shelving. Each of these methods presents particular disadvantages. Boxes and toy chests are often unattractive and frequently occupy substantial quantities of room space. Also, boxes, chests, and shelves seldom permit easy access by the child to the toys, which usually remain hidden from sight. Finally, toy chests with large, heavy lids are dangerous when used by small children. A need has existed and continues to exist for a storage apparatus usable in a child's room which avoids the above-described problems. The present invention satisfies this need, as described herein below.

SUMMARY OF THE INVENTION

It is an object of the present invention to provide an improved, attractive storage device usable for storing a child's toys.

It is another object of the present invention to provide a storage device for toys which is inexpensive to manufacture.

It is another object of the present invention to provide a storage device for toys which facilitates the maintenance of a child's room in a neat and orderly condition.

It is another object of the present invention to provide a storage device for toys which is safe and effective when used around children, lacking rough edges and small, detachable components, and permitting easy access by the child to his toys.

It is a further object of the present invention to provide a storage device for toys which permits a child's toys, including stuffed animals, to be attractively displayed and which occupies a small amount of room space.

These and other objects are achieved in the present invention, which comprises a storage device for toys in the form of a triangular hammock. The hammock has a center region defining a pouch for the placement of toys therein. The hammock is formed of a triangular piece of water-resistant netting material having selectively gathered edges secured within a flexible binding strip. The hammock is adapted to be suspended from its apices from the walls of a room above the floor, preferably in a corner.

Such a hammock provides a storage device for toys which is safe, attractive, inexpensive, and permits easy access to the stored toys by the child. The structural features of the hammock are described in detail herein

DETAILED DESCRIPTION

Figure 1:
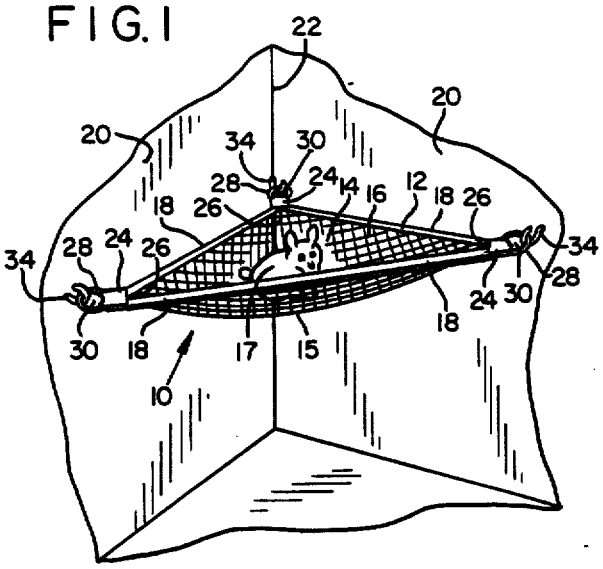
FIG. 1 is a perspective view of a hammock constructed in accordance with the invention suspended in the corner of the room.
Figure 2:
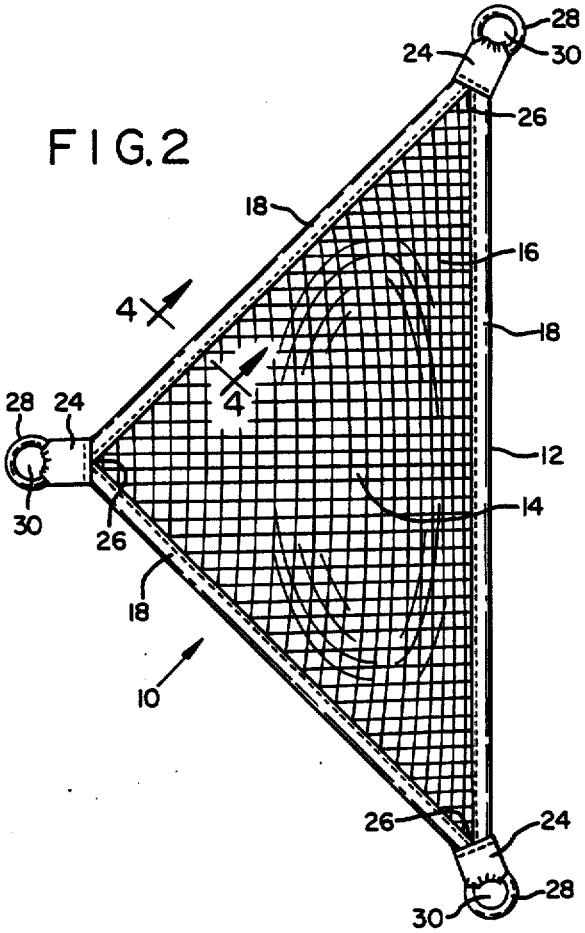
FIG. 2 is a top plan view of a hammock.

With reference to FIGS. 1 and 2, the illustrated hammock 10 includes a triangular body member 12 having a center portion 14 formed of netting 16, preferably of a durable, water-resistant material such as nylon, rayon, olifin or similar synthetic material. The center portion 14 is gathered at portions of its edges in a manner to be described so that when suspended, the center portion forms a pouch 15 in which the articles to be stored, such as a stuffed animal 17 shown in FIG. 1, may be placed. The edges of the center portion 14 are bound within an overfolded bias binding 18 which preferably is of a flexible, non-elastic fabric or similar material.

A suitable material for the center portion 14 consists of two inch mesh, size 60 or 63 knotless brailing netting, although netting of a different size and type obviously may be used. To provide added strength, the individual strands of the netting can be braided or woven in an interlocking arrangement (not shown).

Figure 4:
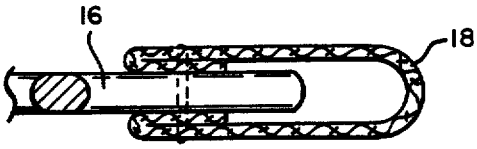
FIG. 4 is an enlarged sectional view taken along line 4—4 of FIG. 2.
Figure 5:
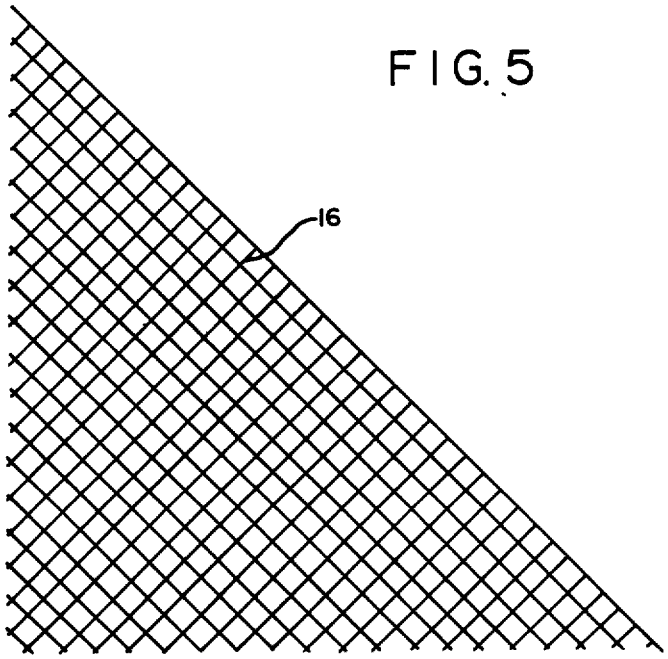
FIG. 5 is a top plan view of an unassembled triangular section of netting as cut to form a hammock in accordance with the invention.
Figure 6:
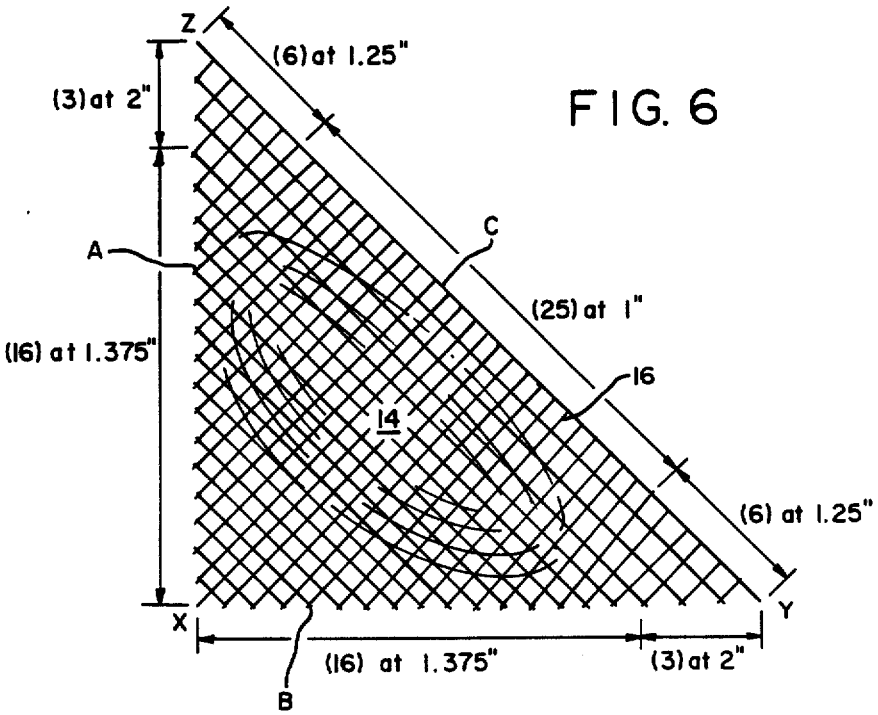
FIG. 6 is a top plan view of the triangular section of netting of FIG. 5 illustrating how the edges are selectively gathered to construct a specific example of a hammock of the invention.

In constructing the hammock 10, a flat, triangular section of the netting 16 is initially provided, as shown in FIG. 5. So that the hammock 10 will form the pouch 15, the edges of the netting 16 are selectively gathered at some locations and stretched at others, as shown in FIG. 6, and the edges bound within a bias binding 18 as indicated in FIG. 4. The amount and extent of gathering and stretching may be varied, depending on the desired size and depth of the pouch 15. The binding 18 preferably comprises a bias cut strip of decorative fabric or other suitable flexible inelastic material, longitudinally folded over the peripheral edges of the netting 16 and sewn thereto, as shown in FIG. 4. Because of the gathering of the netting 16, the length of the netting strands will be greater than the distance between the bound ends of the strands when the hammock is suspended by its corners with the edges substantially straight and horizontal, as shown in FIG. 1, whereby the center portion of the netting will form the pouch 15, as shown.

Figure 3:
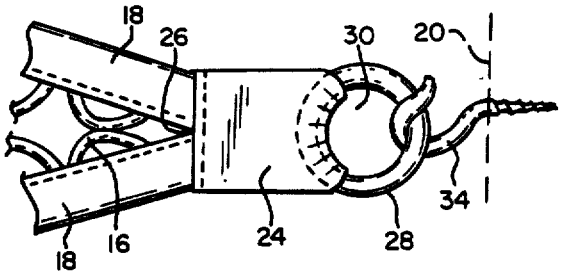
FIG. 3 is an enlarged top plan view of a corner of the hammock.

In a child's room, the hammock 10 is securable in a variety of locations. Ideally, the hammock 10 is secured to the walls 20 in a corner 22 of the room, as shown in FIG. 1. Hanging means, such as a ring 28, is secured to each of the apices 26 by a flexible fabric loop 24, as best shown in FIG. 3. The rings 28 are adapted to engage wall-mounted hooks 34, as shown in FIG. 3.

EXAMPLE

A hammock was constructed in accordance with the invention as follows:

Referring to FIGS. 5 and 6, a size 63 nylon brailing netting of two inch mesh (as measured on the diagonal with the netting stretched) was cut when stretched flat into an isosceles right triangle having lateral sides A and B of 19 meshes extending along the bias of the netting with strand joints intact, and a hypotenuse C of 37 meshes extending along a strand of the netting. To form a pouch in the suspended hammock, the edges of the netting were sewn within the binding 18 with the first 16 meshes of sides A and B from the apex X formed thereby gathered to 1.375 inches apart, and with the last three meshes closest to the apices Y and Z formed with the hypotenuse C spaced at two inches. The hypotenuse C was sewn within the binding 18 with the first six meshes adjacent the apices Y and Z gathered to 1.25 inches and the middle 25 meshes gathered to one inch apart. A hammock of this configuration, when suspended with the sides stretched straight, will form a pouch about six inches deep.

The hammock of the invention, as described above, offers numerous benefits. Specifically, it enables a child's stuffed animals and dolls to be stored in a decorative manner. The pouch configuration of the hammock permits the dolls or stuffed animals to be positioned in an attractive, upright position. Being manufactured of netting, the invention enables a child to see the dolls or stuffed animals from any location in the room. The soft fabric construction and method of installing the invention minimizes the possibility that a child will accidentally hit the invention and become injured.

The hammock may be installed at variable elevations above the floor in a child's room. Average installation time is approximately 5-10 minutes, requiring minimal skill. In addition, the hammock can be used for purposes other than the storage of dolls or toys. By varying the construction materials of the hammock, its weight capacity can range from 30 to 300 pounds. The hammock can be used in boats, motor homes, or other places where storage is needed. When used in a bathroom, the hammock provides an effective place to store bath toys or similar items. The meshed construction of the hammock permits such items to dry at a rapid rate.

Although the invention has been illustrated and described in a preferred embodiment, it will be recognized that variations and changes in arrangement and detail may be made. We claim all such modifications as come within the scope of the attached claims.

We claim:

1. A hammock comprising:

a triangular body member comprised of flexible material, said body member having a center portion comprised of netting;

a flexible inelastic binding extending about the peripheral edge of said center portion and secured thereto; and means attached to the apices of said triangular body member for hanging said body member with the corners thereof substantially in a horizontal plane, the length of each of the strands of said netting being greater than the distance between the points of securement of the ends of a strand to said binding as measured when said corners are in said plane and each of the bound edges is substantially straight whereby said body member will define a pouch for retaining articles placed therein.

2. The hammock of claim 1 wherein said netting comprises two inch mesh.

3. The hammock of claim 2 wherein said netting is comprised of water-resistant material.

4. The hammock of claim 1 wherein said means for hanging said body member comprises a ring attached to each of said apices of said triangular body member.

5. A hammock comprising:

a body portion comprising a right triangular section of flexible netting and flexible inelastic binding secured to the edges of said netting along the full extent thereof;

said binding being of lesser length than the periphery of said netting;

said netting edges being gathered within said binding whereby, when said hammock is suspended from its corners with the bound edges extending substantially horizontally and straight, said netting forms a pouch for retaining objects.

6. The hammock of claim 5 further comprising attachment means at the apices of said body portion for hanging said hammock in position to receive said objects.

7. The hammock of claim 6 wherein said attachment means comprises a plurality of hanging members, one at each of said apices, for attachment to cooperative suspending elements in the wall of a room.

8. The hammock of claim 7 wherein said hanging members each comprise a ring.

9. A hammock comprising:

a triangular body member comprised of flexible material, said body member having a center portion comprising a triangular section made of netting, the edges of said netting being selectively gathered whereby the distance along each gathered edge is less than the normal length of such edge;

a binding comprising a strip of flexible material longitudinally folded over and secured to the peripheral gathered edges of said netting; and means at the corners of said body member for hanging the same from a support with the corners substantially in a horizontal plane whereby said netting will form a pouch for receiving articles.

10. A hammock comprising:

a triangular body member comprised of flexible material, said body member having a center portion comprising an isosceles right triangular section of two inch mesh netting, said triangular section having lateral first and second sides, and a hypotenuse, said hypotenuse extending along a strand of said netting and said lateral sides extending along the bias of said netting adjacent the junction of interlaced net strands, said first and second sides having 19 mesh openings, with said hypotenuse having 37 mesh openings;

a flexible, inelastic binding along the peripheral edges of said netting, said binding comprising a strip of material longitudinally folded over and secured to the peripheral edges of said netting, the first 16 mesh junctions on said first and second sides from the junction of said sides being secured to said binding spaced apart 1.375 inches with the four mesh junctions of said first and second sides closest to said hypotenuse being spaced apart two inches, the first six mesh strands at each end of said hypotenuse being secured to said binding spaced apart 1.25 inches, with the middle 25 mesh strands being spaced apart one inch;

whereby when suspended from its corners with said sides stretched substantially horizontally and straight said center portion will form a pouch for receiving and holding objects;

and means attached to the apices of said triangular body member for hanging said storage apparatus in position to receive said articles to be stored, said means comprising a plurality of rings, one at each of said apices.

*11. A hammock comprising:*

*a body member having an outer peripheral edge and a center portion of a flexible netting with a plurality of strands;*

*said center portion being secured and gathered at least partially along said outer peripheral edge of said body member by a flexible inelastic binding to define a pouch for retaining articles placed therein; and*

*means attached to said body member at more than two points along said outer peripheral edge for hanging said body member with said points thereof substantially in a horizontal plane, the lengths of some of the strands being greater than the distance between said points for hanging said body member as measured along said outer peripheral edge when said binding is substantially straight, whereby when said body member is hung, said body member will be suspended with said pouch defined for retaining said articles placed therein.*

*12. The hammock of claim 11 wherein said flexible netting includes a water-resistant material.*

*13. The hammock of claim 11 wherein said flexible netting includes approximately two inch mesh.*

*14. The hammock of claim 11 wherein said body member is of a generally triangular shape.*

*15. A hammock comprising:*

*a multi-sided body member including at least three sides, a flexible inelastic binding running along an outer peripheral edge of said body member and a center portion of flexible netting;*

*said binding being of a lesser length than the outer peripheral edge of said center portion; and*

*said flexible netting having an edge being at least partially gathered within said binding so that when said hammock is suspended from more than two points along said sides of said multi-sides body member, with said sides extending substantially horizontally and straight, said flexible netting forms a pouch for retaining objects therein.*

*16. The hammock of claim 15 further comprising means attached to said body member at said points of said multi-sided body member for suspending said hammock to receive articles placed within said pouch to be retained therein.*

*17. The hammock of claim 15 wherein said multi-sided body member is of a generally triangular shape.*

*18. In combination a decorative storage device and a number of toys, including stuffed animals, supported therein, which comprises:*

*a plurality of toys;*

*a hammock including a body member having at least three sides in a polygonal configuration, a binding and a center portion;*

*said center portion comprising deformable netting and including an outer peripheral edge;*

*said binding including a strip of flexible inelastic material, with at least a portion of said peripheral edge of the center portion gathered along said binding; and*

*means for hanging said hammock in a position to receive said toys, whereby when said hammock is hung with said toys displayed therein, a pouch is formed in said hammock in which said toys are supported and retained.*

*19. The decorative storage device of claim 18 wherein said means is adapted for attachment to cooperative suspending elements in at least one wall of a room.*

*20. The decorative storage device of claim 18 wherein the sides of said body member form a generally triangular shape.*

*21. A toy storage hammock comprising:*

*a body member of a generally isosceles shape having at least three sides, an outer peripheral edge, a center portion of a flexible netting and a flexible inelastic binding;*

*said center portion being secured along said outer peripheral edge of said body member by said flexible inelastic binding for strengthening, reinforcing and high-lighting said outer peripheral edge;*

*attaching means connected to each apex of said body member along said flexible inelastic binding for attaching said apices of said body member substantially in a horizontal plane; and*

*said body member configured with said isosceles shape to be attached on opposed walls in a corner of a room such that when said body member is hung in said corner, said body member will form a pouch for retaining and displaying toy articles placed therein.*

*22. The hammock of claim 21 wherein said flexible inelastic binding includes a strip of flexible material longitudinally folded over and secured to said outer peripheral edge of said flexible netting.*

*23. The hammock of claim 21 further comprising means attached to said body member at said apices for suspending said hammock to receive said articles placed within said pouch to be retained therein.*

*24. In combination, a decorative storage device and a number of toys, including stuffed animals, supported therein, which comprises:*

*a plurality of toys;*

*a hammock including a generally isosceles-shaped body member having at least three sides, a binding and center portion;*

*said center portion comprising flexible netting and including an outer peripheral edge;*

*said binding including a strip of flexible inelastic material longitudinally folded over and secured to said outer peripheral edge of said flexible netting for strengthening and reinforcing said outer peripheral edge;*

*attaching means connected to each apex of said body member for hanging said hammock in a position to receive said toys; and*

*said hammock and said attaching means configured to form a pouch by said body member in which said toys are supported and retained.*

*25. The decorative storage device of claim 24 wherein said means is adapted for attachment to cooperative suspending elements on opposed walls in a corner of a room.*

* * * * *